Figure 1:
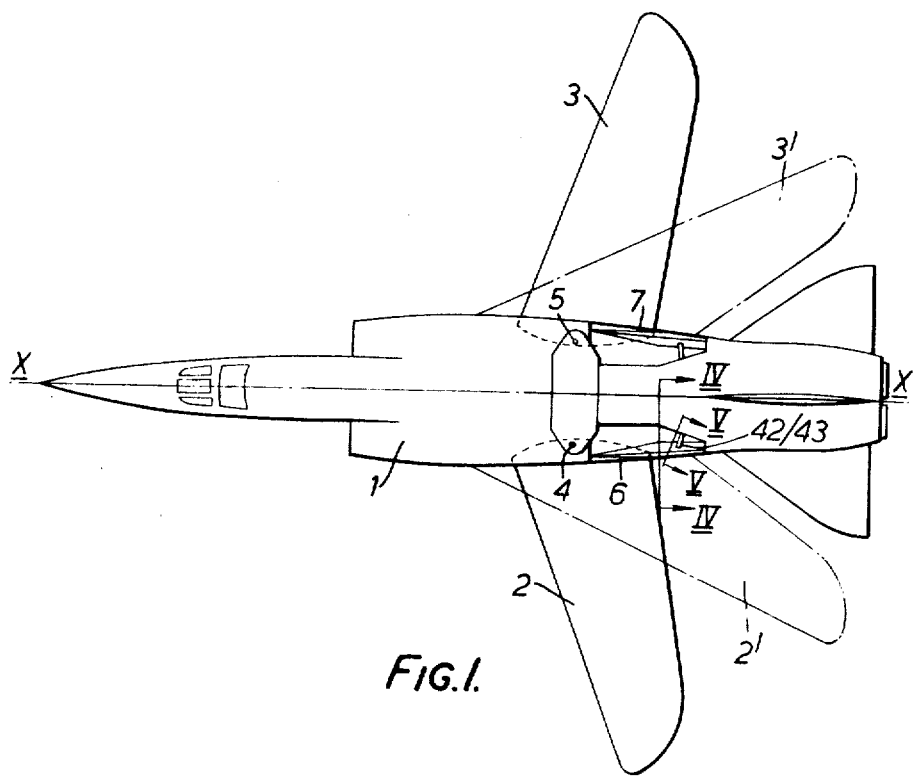

United States Patent
Rhodes et al.

[15] 3,669,367
[45] June 13, 1972

[54] AEROPLANES HAVING VARIABLE SWEEP WINGS

[72] Inventors: Arthur Neville Rhodes; Denis Edward Blackburn, both of Preston, England

[73] Assignee: British Aircraft Corporation Limited, London, England

[22] Filed: Feb. 13, 1970

[21] Appl. No.: 11,278

[30] Foreign Application Priority Data

Feb. 14, 1969 Great Britain..................8,301/69

[52] U.S. Cl..........................................244/46
[51] Int. Cl..........................................B64c 3/40
[58] Field of Search..............244/46, 130, 129 D, 129 R

[56] References Cited

UNITED STATES PATENTS

| | | | |
|---|---|---|---|
| 3,356,317 | 12/1967 | Bird | 244/46 |
| 3,480,237 | 11/1969 | Appleby | 244/46 |
| 3,175,791 | 3/1965 | Toms | 244/46 X |
| 2,822,995 | 2/1958 | Bowen | 244/46 X |

*Primary Examiner*—Duane A. Reger
*Assistant Examiner*—Carl A. Rutledge
*Attorney*—Watson, Cole, Grindle & Watson

[57] ABSTRACT

An aircraft having variable-sweepback wings accommodated in longitudinal slots formed in the sides of the aircraft fuselage, each slot being provided with sets of upper and lower doors which are located above and below the wing and co-act with the wing to keep the gaps between the wing surfaces and the upper and lower edges of the slot substantially closed in all sweepback positions. The upper and lower door sets are spring-biassed towards one another by means of a mechanism comprising a pair of arms pivoted at a common pivot point and inter-connected by a biassing spring, their outer ends being connected respectively to the upper and lower door sets. The arrangement is that as the sweep-back angle is increased, the wing wedges the upper and lower doors apart against the bias, and when the wing deflects vertically, it moves one door set vertically with it and the reaction of the biassing spring causes the other door set to follow by moving simultaneously in the same sense.

8 Claims, 8 Drawing Figures

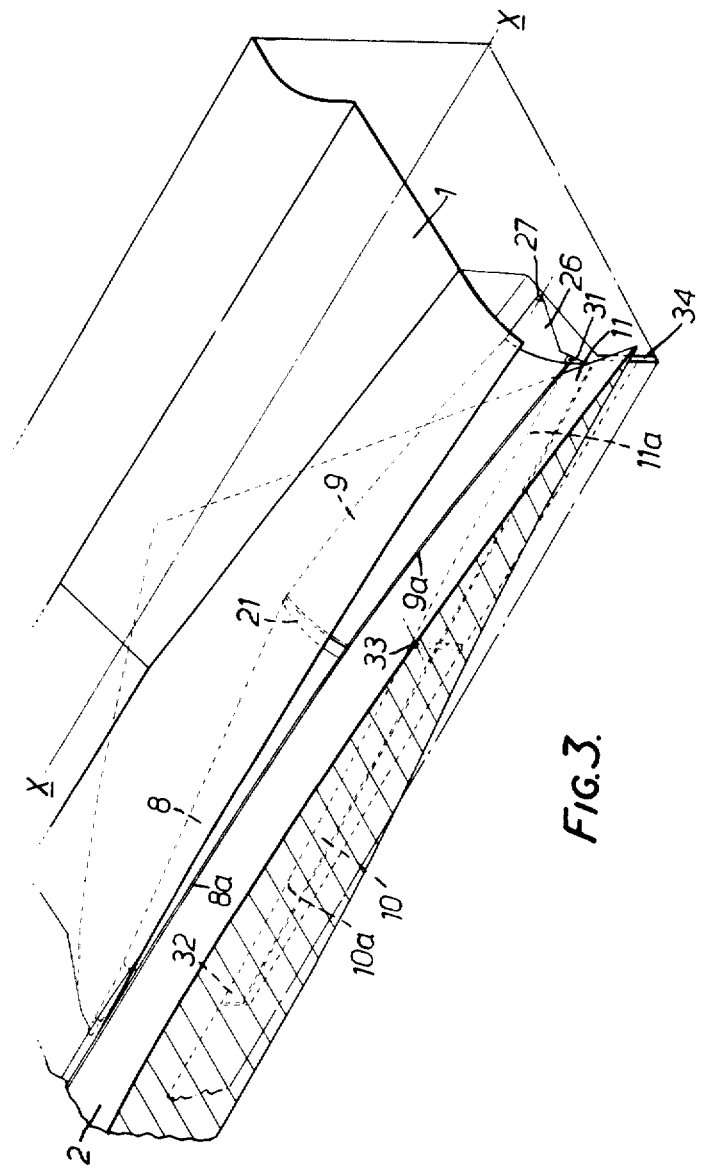

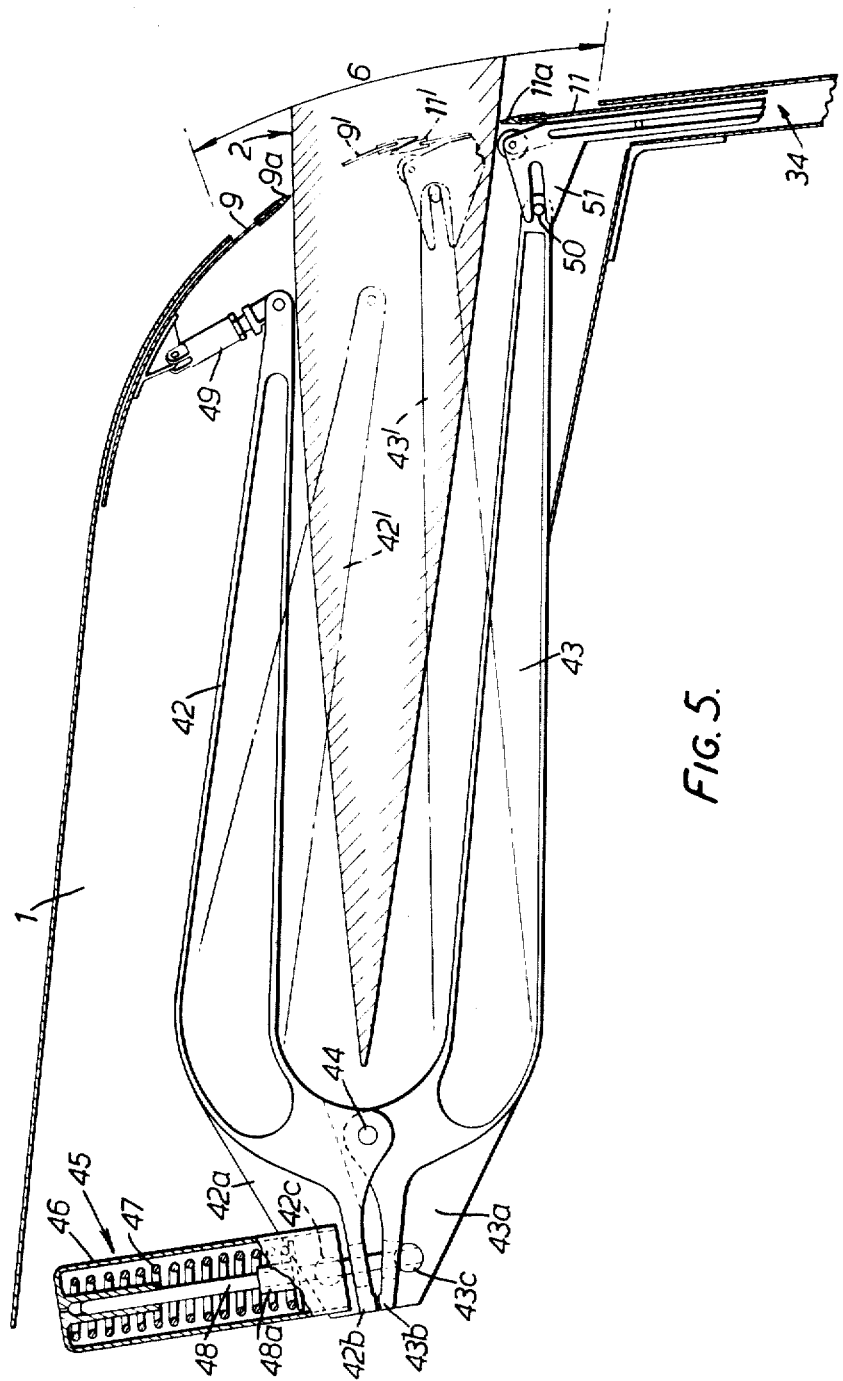

AEROPLANES HAVING VARIABLE SWEEP WINGS

This invention relates to aeroplanes having variable sweep-back wings, that is to say aeroplanes in which the angle of sweep-back of the wings in relation to the fuselage can be varied. The angle of sweep-back of the wings is defined as the angle between the longitudinal axis of either wing and an axis transverse to the fore-and-aft axis of the fuselage.

It is necessary to provide in each side of the fuselage of such an aircraft a longitudinal slot of a size to accommodate the full cross-section of the respective wing along its line of intersection with the fuselage in the position of maximum sweep-back, although in other positions of the wings gaps will then exist in the sides of the fuselage. It has previously been proposed to close and fair these gaps by means of retractile doors mounted on the fuselage in series along the length of the slots and carrying on their edges seal members for sealing against the wing surfaces. Difficulties can be experienced in making such doors follow the transient vertical deflections of the wings which occur in flight.

According to the present invention, an aircraft with variable sweep-back wings has a fuselage having in each side a longitudinal slot of a size to accommodate the full cross-section of the respective wing along its line of intersection with the fuselage in the position of maximum sweep-back angle, sets of retractile upper and lower gap-closing doors mounted on the fuselage respectively above and below the median plane of wing sweep movement and extending along the length of each slot, seal members on the lower edges of the upper doors and on the upper edges of the lower doors for sealing engagement against the upper and lower wing surfaces respectively, and a mechanism arranged to bias the upper and lower doors towards each other, the wing and the biased doors coacting with one another in such a way that during increase of the sweep-back angle, the wedging action of the wing causes the upper and lower doors to move apart against the bias, and vice versa, and during vertical deflection of the wing, the upper and lower doors move substantially simultaneously in the same sense in response to the thrust of the wing on one of them and thus remain in contact with the respective wing surfaces.

With such an arrangement, any vertical deflection of the wing which causes, say, the upper doors to be retracted slightly also results in the lower doors being extended simultaneously and vice-versa.

Preferably the bias mechanism comprises a pair of arms pivoted to the fuselage, arms being respectively connected at one end of each to the upper and lower doors, and a spring device interconnecting the two arms and arranged to bias the said ends of the arms towards each other. In this case the arms may be pivoted on a common pivot intermediate their ends and inboard of the fuselage slot, with their outboard ends connected to the doors, and their inboard ends interconnected by the spring device.

The arms may each be provided with opposed abutment surfaces which cooperate to limit the relative pivotal movement of the arms in direction of door separation (i.e. when the doors reach a certain position of separation the abutment surfaces are closely adjacent or touching one another. In this condition, vertical deflection of the wing causes the abutment surfaces to contact one another if they are not already engaged, thereby transmitting any movement of one arm directly to the other and not through the spring device. The doors can thus closely follow any large and rapid deflections of the wing whilst remaining in contact with the respective wing surfaces.

Figure 4A:
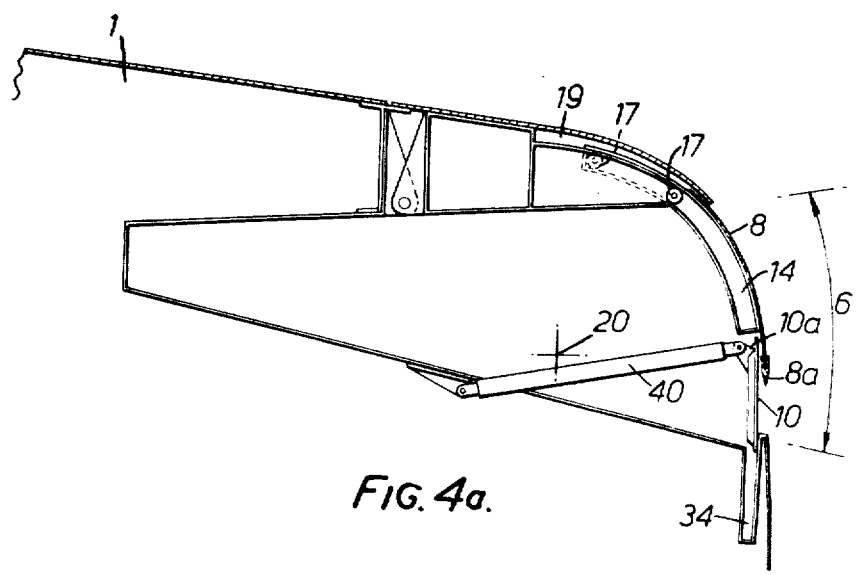
Figure 2:
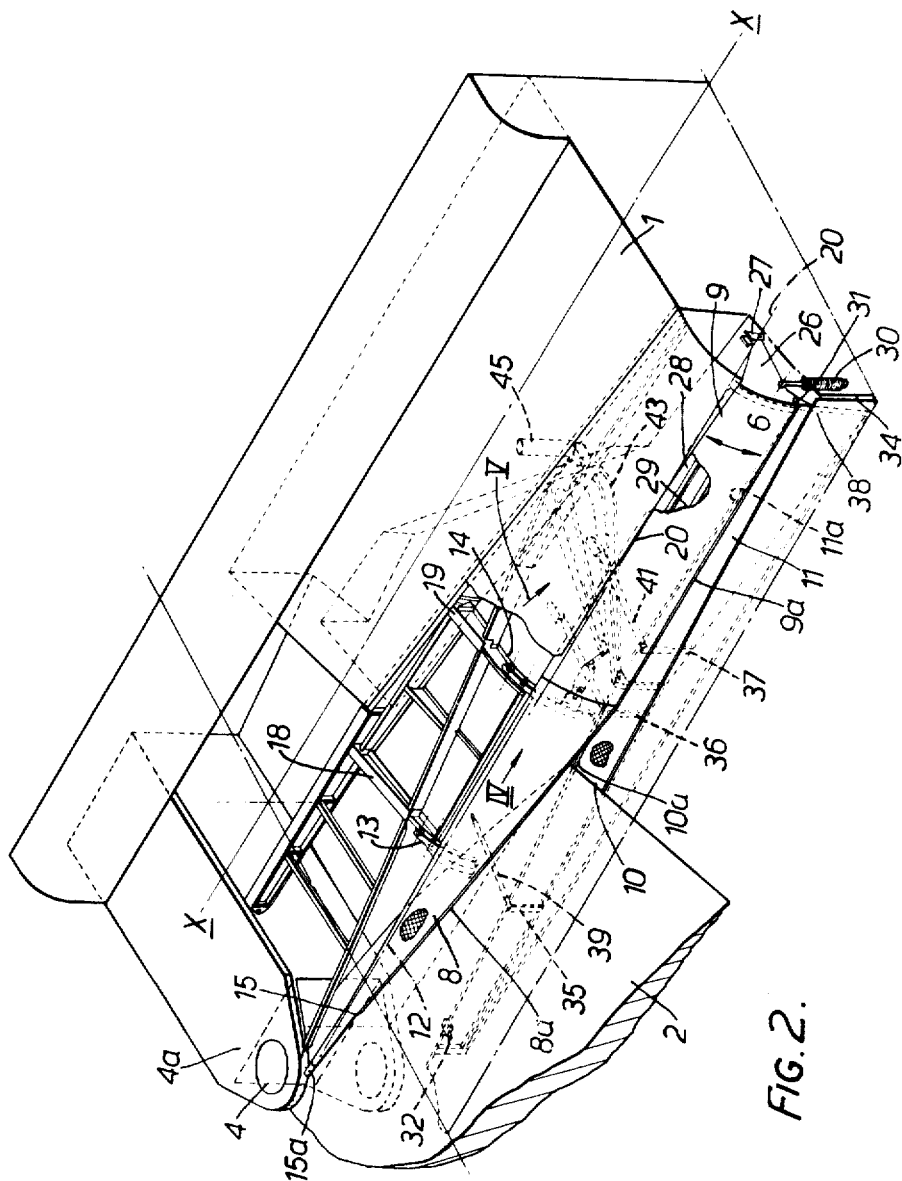
Figure 2A:
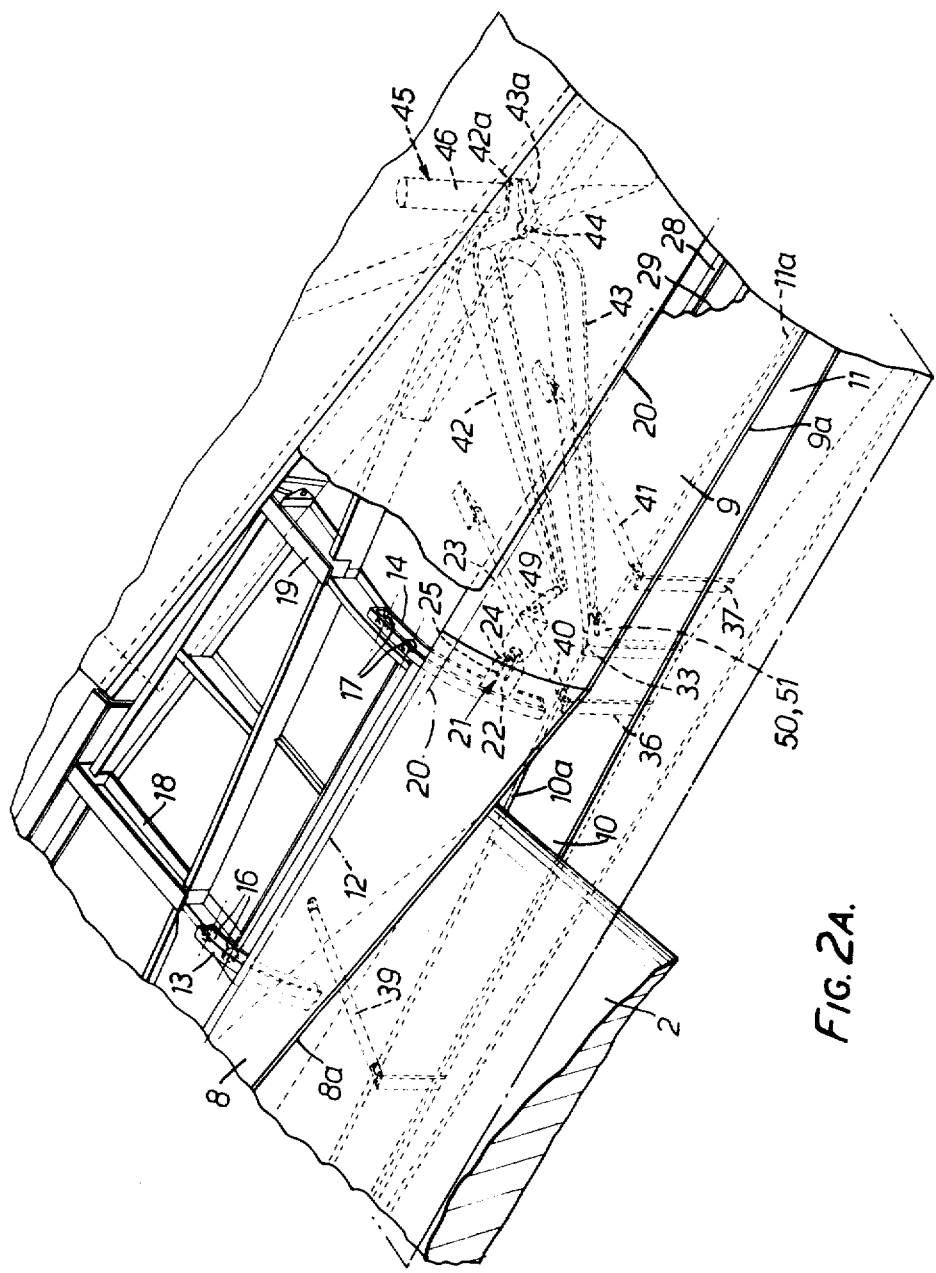
Figure 4B:
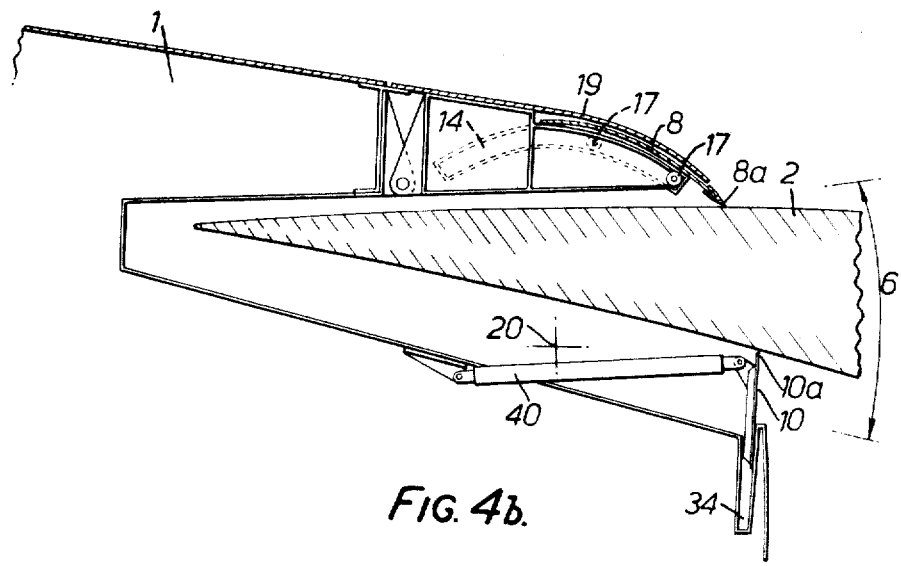
Figure 4C:
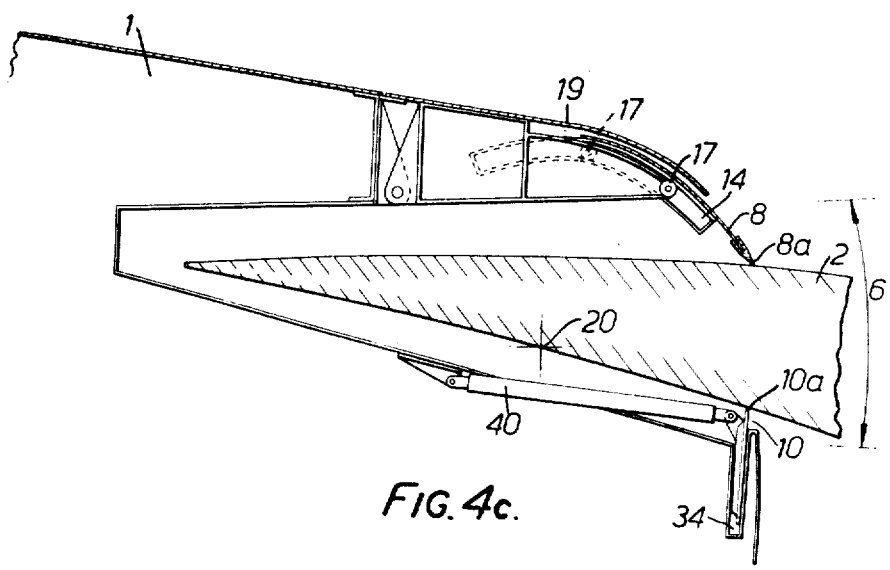

A specific embodiment of the invention will now be described by way of example and with reference to the accompanying drawings, in which:

FIG. 1 is a plan view of a variable sweep-back winged aircraft,

FIG. 2 is a perspective three-quarter rear view of part of an aircraft fuselage showing a wing slot with the wing in a position of minimum sweep-back angle, FIG. 2A is an enlarged view of a portion of FIG. 2, FIG. 3 is a similar view with the wing fully swept-back, FIGS. 4a, 4b and 4c are part cross-sections of the aircraft fuselage in the region of the wing slot with the wing in various positions, the cross-sections being taken on the line IV—IV of FIG. 1, that is to say as viewed along Arrow IV of FIG. 2, and, FIG. 5 is a further part cross-section of the aircraft fuselage in the region of the wing slot, taken on the line V—V of FIG. 1, that is to say as viewed along Arrow V of FIG. 2.

Referring initially to FIG. 1, an aircraft has a fuselage 1 with a fore-and-aft axis X—X and variable sweep-back wings 2 and 3 which respectively pivot with respect to the fuselage 1 on pivot assemblies 4 and 5. The wings are accommodated in substantially rectangular slots 6 and 7 in the sides of the fuselage 1. For ease of description the slots and their closure means will be described with reference to the port side of the aircraft only, that is to say with reference to the wing 2 and the slots 6. The starboard slot 7 and its closure means is identical to that about to be described.

Referring now to FIGS. 2 to 5, the slot 6 is closed by retractile upper doors 8 and 9 above the median plane of wing sweep-back movement and retractile lower doors 10 and 11 below it.

The forward upper door 8 is part-conical in shape, the axis 12 about which the part cone is formed being positioned at an angle to the fore-and-aft axis X—X and sloping downwardly and inwardly aft, such that a wing-engaging lip 8a of the door is coincident with the wing/fuselage intersection line.

The door is arranged to revolve about the axis 12. This feature together with the choice of angle of the cone and its base radius are such that the lip 8a maintains contact with the wing surface along the whole of its length (to within ± 0.1 inch) when the wing sweep-back angle is varied. This contact is maintained for all wing deflections as the aircraft manoeuvres, even under maximum positive and negative g loadings at all angles of sweep-back.

The door 8 is of honeycomb sandwich construction and carries a track 13 intermediate its ends and a track 14 at its rearward end. The track 14 is clearly shown in FIGS. 4a, b and c.

At its forward end, the door 8 carries a fitting 15 which houses a part-spherical bearing 15a. The center of the bearing 15a is coincident with the apex of the cone about which the door 8 if formed. The fitting 15 is connected to a supporting lug 4a of the wing pivot 4 and thus provides a support for the forward end of the door 8 and about which it can revolve.

The tracks 13 and 14 are engaged by rollers 16 and 17 respectively mounted on fuselage ribs 18 and 19. Both tracks 13 and 14 are of arcuate form and their respective radii and location are such that the door 8 is constrained to revolve about its axis 12.

The rear upper door 9 which is disposed in tandem with the door 8 is part-cylindrical in shape, the radius of the cylinder matching the radius of the aft edge of the door 8 (that is to say, is equal to the base radius of the cone about which the door 8 is formed). The door 9 is arranged to revolve about the axis 20 of the cylinder about which it is formed, this axis 20 lying parallel to the fore-and-aft axis X—X of the aircraft. The forward end of the door 9 is connected to the rear end of the door 8 by means of a coupling 21 comprising a bracket 22 on the door 8, and a bracket 23 on the door 9, the brackets 22 and 23 being interconnected by means of a part-spherical bearing 24 on bracket 23 constrained to slide in a track 25 formed on bracket 22. Thus a coupling is provided which can accommodate both relative fore-and-aft and twisting movement of the doors 8 and 9. Such a coupling is necessary since the doors revolve about different axes 12 and 20. The coupling 21 also provides an anchorage for the upper arm of a door biasing mechanism to be described.

The aft end of the door 9 carries a segment 26, the apex of which is pivotally connected to the fuselage 1 by means of a part-spherical bearing 27 situated on the axis 20. In addition to allowing the door 9 to revolve about the axis 20, the bearing 27 allows the door to twist.

The door 9 is constructed of longitudinal stringers 28 attached to an outer skin 29, so that the structure is resistant to bending to support air loads but has low resistance to torsion loads. The door 9 can thus readily temporarily twist but does not readily buckle.

A light stabilising spring 30 is provided between the segment 26 and the fuselage 1 to steady the door 9 when the wing 2 is in a forward position.

The segment 26 also has a coupling 31 incorporating a part-spherical bearing which connects to the lower aft door 11.

The forward lower door 10 and the aft lower door 11 are both flat and are both of honeycomb construction, and are disposed in tandem with one another. The door 10 is pivoted at its forward end to the fuselage structure at 32 and at its aft end is coupled to the forward end of the door 11 by means of a pin and bush joint 33. This joint 33 allows relative rotation of the doors 10 and 11 within their common plane. It also forms an anchorage for the lower arm of the door biasing mechanism to be later described. The aft end of the door 11 is pivotally connected to the upper aft door 9 by means of the coupling 31.

Both lower doors 10 and 11 are constrained to slide generally vertically in a narrow channel 34 formed just inboard of the lower fuselage contour. Tracks 35 and 36 are provided to guide the door 10 in the channel 34. Similar tracks 37 and 38 are provided for the door 11.

Each lower door 10 and 11 is provided with additional support means (against air loads and loads imposed by the biasing mechanism) in the form of radius rods 39 and 40 (door 10) and radius rod 41 (door 11). The rods 39, 40 and 41 are each pivoted to the fuselage 1 at one end and pivoted to a respective door at the other.

Both the upper doors, 8 and 9, and the lower doors, 10 and 11, have flexible sealing strips along their wing-surface-engaging lips. These lips are referenced 8a, 9a and 10a and 11a respectively.

The upper doors, 8 and 9, and the lower doors, 10 and 11, are respectively biased towards one another by the biasing mechanism previously referred to. This mechanism is illustrated in detail in FIG. 5 and is now described with primary reference to that Figure.

The biasing mechanism comprises an upper arm 42 and a lower arm 43 pivoted on a common pivot 44 to the aircraft fuselage 1. The axis of the pivot 44 lies within the median plane of wing-sweep but is angled to the fore-and-aft axis X—X of the aircraft to lie generally parallel with the trailing edge of the wing 2 when the wing is in its position of maximum sweep. The arms 42 and 43 thus extend outwards and forwards.

Since their common pivot 44 lies within the median plane of wing-sweep, the arms 42 and 43 are spaced apart vertically to accept the wing trailing edge between them as the wing 2 approaches and reaches its position of maximum sweep-back angle. The arms 42 and 43 are, accordingly, shaped to converge at the pivot 44. Extended portions 42a and 43a inboard of the pivot 44 are formed respectively on each arm to provide anchorages for a spring device 45.

The spring device 45 includes a cylinder 46 having an open end and a closed end, a coil spring 47 housed therein, a rod 48 with an abutment 48a formed thereon and arranged to compress the spring 47 between the abutment and the closed end of the cylinder. The rod 48, in effect, forms a piston rod and is pivotally connected at 43c to the inboard portion 43a of the lower arm. The cylinder is itself pivotally connected at 42c to the inboard portion 42a of the upper arm. The arrangement is such that the outboard extremities of the arms 42 and 43 (and hence the respective upper and lower doors to which the arms are connected) are biased towards each other by way of the spring 47.

The outboard extremity of the upper arm 42 is coupled to the bracket 23 of the coupling 21 between the two upper doors 8 and 9 by means of a pivoted link 49.

The outboard extremity of the lower arm 43 is connected to the joint 33 between the lower doors 10 and 11 by means of a sliding joint comprising a spigot 50 on the arm 43 engaging a fork 51 mounted on a component of the joint 33.

The inboard extensions 42a and 43a of the upper and lower arms are provided with opposed abutment surfaces 42b and 43b respectively. These surfaces are located to abut one another when the outboard ends of the arms 42 and 43 are moved apart by more than a predetermined distance so that the arms cannot move further apart relatively but must then pivot as a unit.

In operation, assuming the wing 2 is in its position of minimum sweep-back angle (shown in hard outline in FIGS. 1 and 2), the upper doors 8 and 9 are biased downwards by the action of the spring 47 on the arm 42, so that the lip 8a of the forward door 8 contacts the wing upper surface, and so that the rear door 9 is at the lowermost extent of its travel. In this position the lip 9a of this door overlaps the lip 11a of the lower rear door 11 which, together with its associated lower forward door 10, is biased upwards under the action of the spring 47 on the arm 43. In this connection, it will be appreciated that as the spring 47 effectively operates between the arms 42 and 43, movement of one arm and the doors connected thereto is reacted via the spring 47 by a corresponding movement of the other arm and also the doors connected thereto. The door 10 is biased upwards so that its lip 10a contacts the undersurface of the wing 2 and the door 11 is biased upwards to its fullest extent. This "closed" position of the doors is illustrated in FIG. 2, FIG. 4a, and in FIG. 5. In the latter Figure the "closed" doors are shown at $9^1$ and $11^1$ and the corresponding position of the arms are shown in chained outline at $42^1$ and $43^1$.

In this condition, when the wing 2 deflects vertically, say upwards, due to aircraft flight manoeuvres and/or gust loadings, the upper surface of the wing causes the door 8 to revolve about its axis 12 so that the lip 8a moves generally upwards but still remains in contact with the wing. The arm 42, being coupled to the door 8, is caused to pivot upwards against the force of the spring 47, which movement is substantially simultaneously reacted by a corresponding upward pivotal movement of the arm 43.

If the spring 47 is chosen to be of a high rate (i.e. not easily compressed) the two arms 42 and 43 tend to pivot as a unit when one arm is deflected. If, however, the spring 47 is chosen to be of a low rate (i.e. easily compressed) the deflected arm will move appreciably relatively to the other arm as the spring compresses before this extra compression of the spring is reacted by movement of the other arm.

In either case, the upward pivotal movement of the arm 43 causes the door 10 to swing upwards in its tracks 35 and 36 against the under surface of the wing. The rear doors 9 and 11, being respectively coupled to the arms 42 and 43 and the forward doors 8 and 10, move substantially simultaneously upwards (the door 9 revolving about its axis 20 and the door 11 moving substantially vertically) to maintain a generally constant overlap of their lips 9a and 11a. The slot 6 aft of the wing 2 thus remains fully closed.

Assuming that the wing 2 is now moved to an intermediate position of greater sweep-back, the forward doors 8 and 10 are urged apart against the bias of the spring 47 by the wedge-action of the wing trailing edge, the upper door 8 rotating (upwards) about its axis 12 and the lower door 10 being swung downwards in its tracks 35 and 36. The lips 8a and 10a of the doors remain in contact with their respective wing surfaces. The rear doors 9 and 11 are also moved apart, but by a lesser amount than the forward doors. The overlap of their lips 9a and 11a is accordingly reduced but the gap 6 remains closed.

The effect of wing vertical deflection is similar to that when the wing 2 is in its position of minimum sweep-back angle.

As the wing is moved further to its position of maximum sweep-back angle, gaps between the doors and the wing surfaces temporarily develop, but at the position of maximum sweep-back no gaps remain. This latter condition is illustrated in FIGS. 1 (at $2^1$ and $3^1$), 3, 4b, 4c and 5. In the condition of maximum sweep-back angle the forward upper door 8 has revolved further into the fuselage about its axis 12, but the rear upper door 9, additionally to revolving about its axis 20, is caused to twist due to the action of the wing upper surface.

The forward end of the door 9, in fact, has to deflect by about half the wing thickness compared with the rear end of the door; it is for this reason that the door 9 is constructed with low stiffness in torsion. This deflection of the door 9 is shown clearly in FIG. 3.

The lower forward door 10 has swung downwards to accommodate the wing, as has the rear lower door 11, both in their common generally vertical plane.

In this condition the arms 42 and 43 have been pivoted apart about their common pivot 44 against the bias of the spring 47, and the wing trailing edge is accommodated between them as clearly shown in hard outline in FIG. 5. The opposed abutment surfaces 42b and 43b on the respective arms are now closely adjacent one another or are actually touching.

In this position of maximum sweep-back, when the wing deflects vertically, again say upwards, the upper doors 8 and 9 are caused to revolve generally upwards under the action of the wing upper surface and hence the arm 42 is pivoted upwards. This causes the abutment surfaces 42b and 43b to engage one another if they are not doing so already, and hence the movement of the arm 42 is directly passed to the arm 43 which simultaneously moves the lower doors 10 and 11 generally upwards. Thus in this condition the four doors and the twin arms are operated as a unit actuated by wing deflection. The doors thus remain in close contact with and are, in effect, locked to the wing surfaces even during rapid and relatively large wing deflections. It will be appreciated that the greatest wing deflections occur in the high-speed maximum-sweep-back condition.

In FIGS. 4b and 4c the position of the wing and of the doors 8 and 10 are illustrated with the wing at maximum sweep-back but deflected upwards and slightly downwards, respectively.

The slot 6 is kept fully "closed" in all wing positions except for a short range between the intermediate and maximum sweep-back position. The doors 8,9,10 and 11 form an independent closure system, which does not relay upon the aircraft's power supplies, which can be made as a separate assembly and which can be removed as a unit from the aircraft. The doors are operated solely by wing movements and deflections and thus require no attention from a pilot except for observation of any malfunction warning lights which may be provided. The four doors can be shaped and constructed to sustain the maximum aerodynamic differential pressures met in service, they are free of any tendency to flutter and they have low aerodynamic drag.

What we claim as our invention and desire to secure by Letters Patent is:

1. An aircraft with variable sweepback wings having a fuselage with a longitudinal slot in each side of a size to accommodate the full cross-section of the respective wing along its line of intersection with the fuselage in the position of maximum sweep-back angle, sets of rigid retractile gap-closing upper and lower doors mounted on the fuselage respectively above and below the median plane of wing sweep movement and extending along the length of each slot, each said upper door being opposed to a respective one of said lower doors and being separable from its said opposed lower door to receive said wing between said opposed upper and lower doors, seal members on the lower edges of the upper doors and on the upper edges of the lower doors for sealing engagement against the upper and lower wing surfaces respectively, a pair of arms pivotally supported in the fuselage, the arms extending transversely to the respective upper and lower doors of a said pair of opposed doors and being respectively connected at one end of each to said upper and lower doors, and a spring device interconnecting the two arms and arranged to bias the said ends of the two arms towards each other and thereby to bias the said ends of the two arms towards each other and thereby to bias said opposed upper and lower doors towards each other in such manner that upward movement of said upper door increases the upward bias on said opposed lower door and vice versa and downward movement of said lower door increases the downward bias on said upper door and vice versa, in such a way that during alteration of the sweep-back angle in one direction the wing by a wedging action causes said opposed upper and lower doors to move apart against the bias, and during vertical deflection of the wing, said opposed upper and lower doors move substantially simultaneously in the same sense in response to the thrust of the wing on one of them and thus remain in sealing engagement against the respective wing surfaces.

2. An aircraft according to claim 1 in which the two arms are pivoted on a common pivot intermediate their ends and inboard of the fuselage slot, the outboard ends of the arms being connected to the doors, and their inboard ends being interconnected by the spring device.

3. An aircraft according to claim 1 in which the arms are respectively provided with opposed abutment surfaces which cooperate to limit the relative pivotal movement of the arms in the direction corresponding to door separation.

4. An aircraft according to claim 1 wherein the arms are so shaped and so positioned that the wing can lie between them in the position of maximum sweep-back.

5. An aircraft according to claim 1 having two upper and two lower gap-closing doors, the upper two doors being coupled together in tandem and the lower two doors being also coupled together in tandem, and the rear upper and lower doors being connected one to the other.

6. An aircraft according to claim 5 wherein the forward upper door is in the form of a part-cone and is arranged to revolve about the axis of the cone, and the rear upper door is in the form of a part-cylinder and is arranged to revolve about the axis of the cylinder, the base radius of the part-cone and the radius of the part-cylinder being substantially equal.

7. An aircraft according to claim 6 in which the rear upper door is of a construction having low resistance to torsional loads, such that the door can readily temporarily twist about its longitudinal axis.

8. An aircraft according to claim 5 wherein the forward lower door and the rear lower door are both flat and are constrained to move substantially within their own common plane.

* * * * *